(12) United States Patent
Yahata

(10) Patent No.: US 8,106,962 B2
(45) Date of Patent: Jan. 31, 2012

(54) IMAGE CORRECTION APPARATUS, IMAGE CORRECTION METHOD AND STORAGE MEDIUM FOR IMAGE CORRECTION PROGRAM

(75) Inventor: Takashi Yahata, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 305 days.

(21) Appl. No.: 12/565,841

(22) Filed: Sep. 24, 2009

(65) Prior Publication Data

US 2010/0079614 A1   Apr. 1, 2010

(30) Foreign Application Priority Data

Sep. 30, 2008   (JP) ................. 2008-254389

(51) Int. Cl.
*H04N 5/235* (2006.01)
*H04N 9/73* (2006.01)
*H04N 5/222* (2006.01)

(52) U.S. Cl. ............... 348/223.1; 348/221.1; 348/224.1; 348/370; 348/371

(58) Field of Classification Search ............... 348/221.1, 348/229.1, 362, 364, 228.1, 223.1, 224.1, 348/225.1, 370–371
See application file for complete search history.

(56) References Cited

U.S. PATENT DOCUMENTS

| | | | |
|---|---|---|---|
| 4,574,319 A | 3/1986 | Konishi | |
| 5,142,380 A | 8/1992 | Sakagami et al. | |
| 5,838,379 A | 11/1998 | Takayama | |
| 2004/0233298 A1 | 11/2004 | Aotsuka | |
| 2005/0123210 A1 | 6/2005 | Bhattacharjya | |
| 2006/0050157 A1* | 3/2006 | Tsuruoka | 348/241 |
| 2006/0227227 A1* | 10/2006 | Tsuruoka | 348/241 |
| 2009/0073288 A1 | 3/2009 | Tsuruoka | |
| 2009/0086062 A1 | 4/2009 | Tsuruoka | |

FOREIGN PATENT DOCUMENTS

| | | |
|---|---|---|
| DE | 10 2006 061 972 | 5/2008 |
| EP | 1 351 524 | 10/2003 |
| EP | 1 571 594 | 9/2005 |
| JP | 07-143513 | 6/1995 |
| JP | 09-284429 | 10/1997 |

(Continued)

OTHER PUBLICATIONS

European Search Report for 09170143.3 mailed on Jan. 26, 2010.

*Primary Examiner* — Jason Chan
*Assistant Examiner* — Joel Fossselman
(74) *Attorney, Agent, or Firm* — Turocy & Watson, LLP

(57) ABSTRACT

An image correction apparatus comprises an image capture unit configured to capture image data, a separator unit configured to separate the image data into luminance data and color-difference data, a conversion unit configured to convert the color-difference data into a set of amplitude values in a spatial frequency domain, a light-source state detector configured to detect a light-source state when the image capture unit captures the image data, a correction unit configured to correct the set of amplitude values based on the light-source state so that a predetermined amplitude value is decreased, an inverse-conversion unit configured to inversely convert the set of the amplitude values which is corrected by the correction unit to produce corrected color-difference data, and a corrected image generator configured to generate corrected image data from the corrected color-difference data and the luminance data.

6 Claims, 9 Drawing Sheets

FOREIGN PATENT DOCUMENTS

| | | |
|---|---|---|
| JP | 2002-152530 | 5/2002 |
| JP | 2003-060913 | 2/2003 |
| JP | 2003-234950 | 8/2003 |
| JP | 2005-269451 | 9/2005 |
| JP | 2006-309749 | 11/2006 |
| JP | 2007-049721 | 2/2007 |
| JP | 2008052428 | 3/2008 |
| WO | 2004006588 | 1/2004 |
| WO | 2008/111236 | 9/2008 |

* cited by examiner

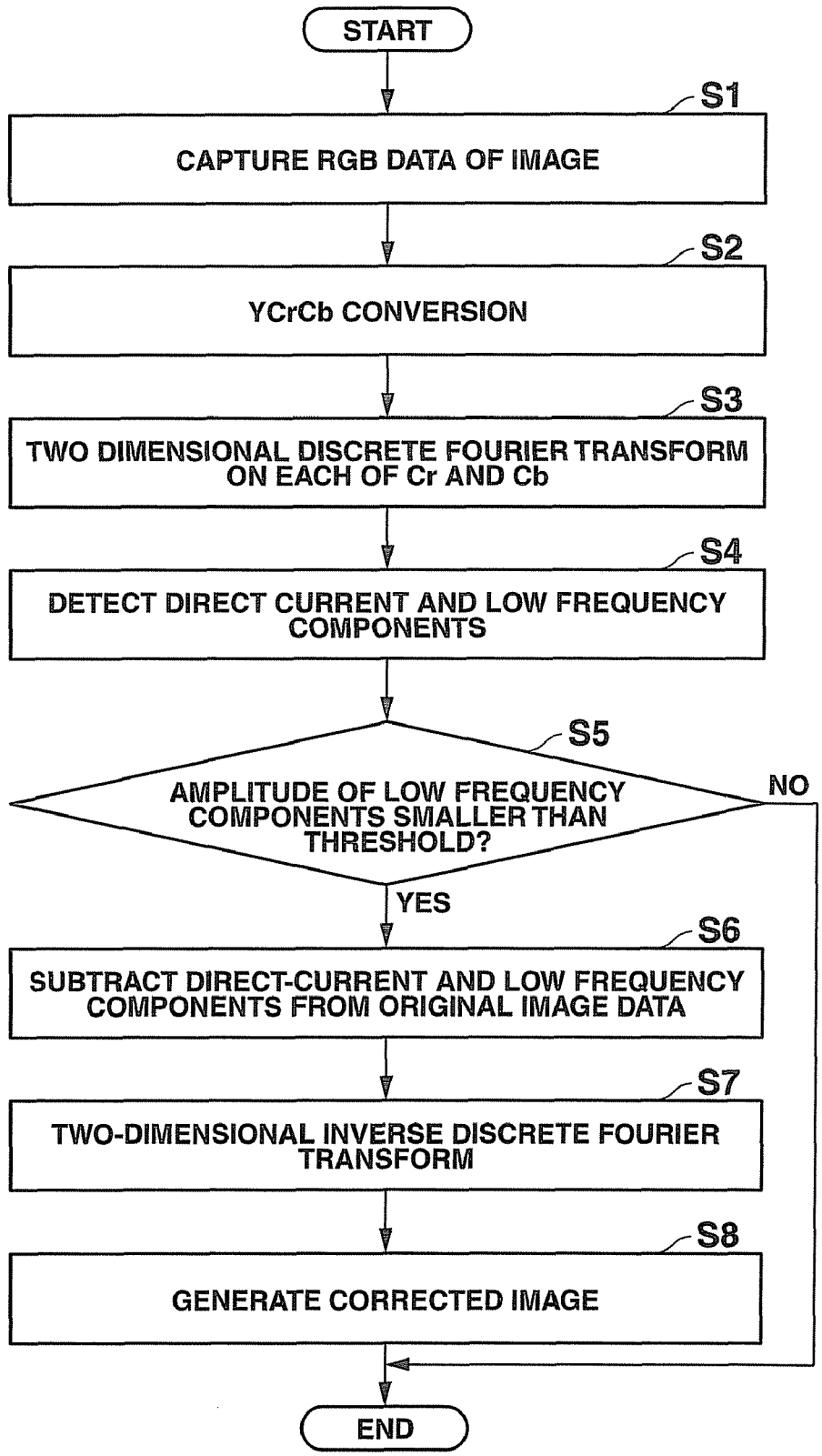

FIG.8

| TIME | FLASH | THRESHOLD |
|---|---|---|
| 6-20 | NONE | ×1 |
| 6-20 | GN10 | ×2 |
| 6-20 | GN20 | ×3 |
| 6-20 | GN30 | ×4 |
| 20-6 | NONE | ×5 |
| 20-6 | GN10 | ×6 |
| 20-6 | GN20 | ×7 |
| 20-6 | GN30 | ×8 |

FIG.9

| TIME | THRESHOLD |
|---|---|
| 6-20 | ×9 |
| 20-6 | ×10 |

FIG.10

| FLASH | THRESHOLD |
|---|---|
| NONE | ×11 |
| GN10 | ×12 |
| GN20 | ×13 |
| GN30 | ×14 |

FIG.11

| EXPLANATION | THRESHOLD |
|---|---|
| DAYTIME, NO-FLASH | ×15 |
| DAYTIME, INTERNAL FLASH ONLY | ×16 |
| DAYTIME, WITH EXTERNAL FLASH | ×17 |
| NIGHT, NO-FLASH | ×18 |
| NIGHT, INTERNAL FLASH ONLY | ×19 |
| NIGHT, WITH EXTERNAL FLASH | ×20 |

FIG.12

| EXPLANATION | THRESHOLD |
|---|---|
| INITIAL SETTING | ×21 |

IMAGE CORRECTION APPARATUS, IMAGE CORRECTION METHOD AND STORAGE MEDIUM FOR IMAGE CORRECTION PROGRAM

CROSS-REFERENCE TO RELATED APPLICATIONS

This application is based upon and claims the benefit of priority from prior Japanese Patent Application No. 2008-254389, filed Sep. 30, 2008, the entire contents of which are incorporated herein by reference.

BACKGROUND OF THE INVENTION

1. Field of the Invention

The present invention relates to an image correction apparatus, an image correction method and a storage medium for an image correction program.

2. Description of the Related Art

Jpn. Pat. Appln. KOKAI Publication No. 2008-052428 discloses an image processor for correcting an image which is captured under an environment where there are a plurality of light sources such as the sun and an illumination light source. The image processor divides the image into a plurality of areas and performs different image processing on the respective areas. Accordingly, the image processor reduces effect of the plurality of light sources to obtain a preferably corrected image.

However, since the image processor performs different processing on the respective areas, processing results may be discontinuous on a boundary between areas.

BRIEF SUMMARY OF THE INVENTION

According to an embodiment of the present invention, an image correction apparatus comprises:
an image capture unit configured to capture image data;
a separator unit configured to separate the image data into luminance data and color-difference data;
a conversion unit configured to convert the color-difference data into a set of amplitude values in a spatial frequency domain;
a light-source state detector configured to detect a light-source state when the image capture unit captures the image data;
a correction unit configured to correct the set of amplitude values based on the light-source state so that a predetermined amplitude value is decreased;
an inverse-conversion unit configured to inversely convert the set of the amplitude values which is corrected by the correction unit to produce corrected color-difference data; and
a corrected image generator configured to generate corrected image data from the corrected color-difference data and the luminance data.

According to another embodiment of the present invention, an image correction method comprises:
separating captured image data into luminance data and color-difference data;
converting the color-difference data into a set of amplitude values in a spatial frequency domain;
detecting a light-source state when the image data is captured;
correcting the set of amplitude values based on the light-source state so that a predetermined amplitude value is decreased;
inversely converting the set of the amplitude values which is corrected to produce corrected color-difference data; and
generating corrected image data from the corrected color-difference data and the luminance data.

According to another embodiment of the present invention, a computer readable storage medium having a computer program stored thereon that is executable by a computer, the computer program controls the computer to perform:
separating captured image data into luminance data and color-difference data;
converting the color-difference data into a set of amplitude values in a spatial frequency domain;
detecting a light-source state when the image data is captured;
correcting the set of amplitude values based on the light-source state so that a predetermined amplitude value is decreased;
inversely converting the set of the amplitude values which is corrected to produce corrected color-difference data; and
generating corrected image data from the corrected color-difference data and the luminance data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention and, together with the general description given above and the detailed description of the embodiments given below, serve to explain the principles of the invention in which:

FIG. 3 is a flowchart showing schematic procedure of image correction processing;

FIG. 8 is a threshold table relating to time of image capture and flash light emission amount;

FIG. 9 is a threshold table relating to time of image capture;

FIG. 10 is a threshold table relating to flash light emission amount;

FIG. 11 is a threshold table relating to setting made by a user; and

FIG. 12 is a threshold table relating to initial setting.

DETAILED DESCRIPTION OF THE INVENTION

Hereinafter, an embodiment of an image correction apparatus according to the present invention will now be described with reference to the accompanying drawings.

Now, an explanation will be given on a functional configuration of an image capture apparatus 1 which realizes an embodiment of the present invention. The image capture apparatus 1 has an image correction function to correct a captured image that is obtained by shooting an object. Implementation of the image correction function is not limited to the image capture apparatus 1 described herein. The image correction function may be realized by a personal computer or the like.

Figure 1:
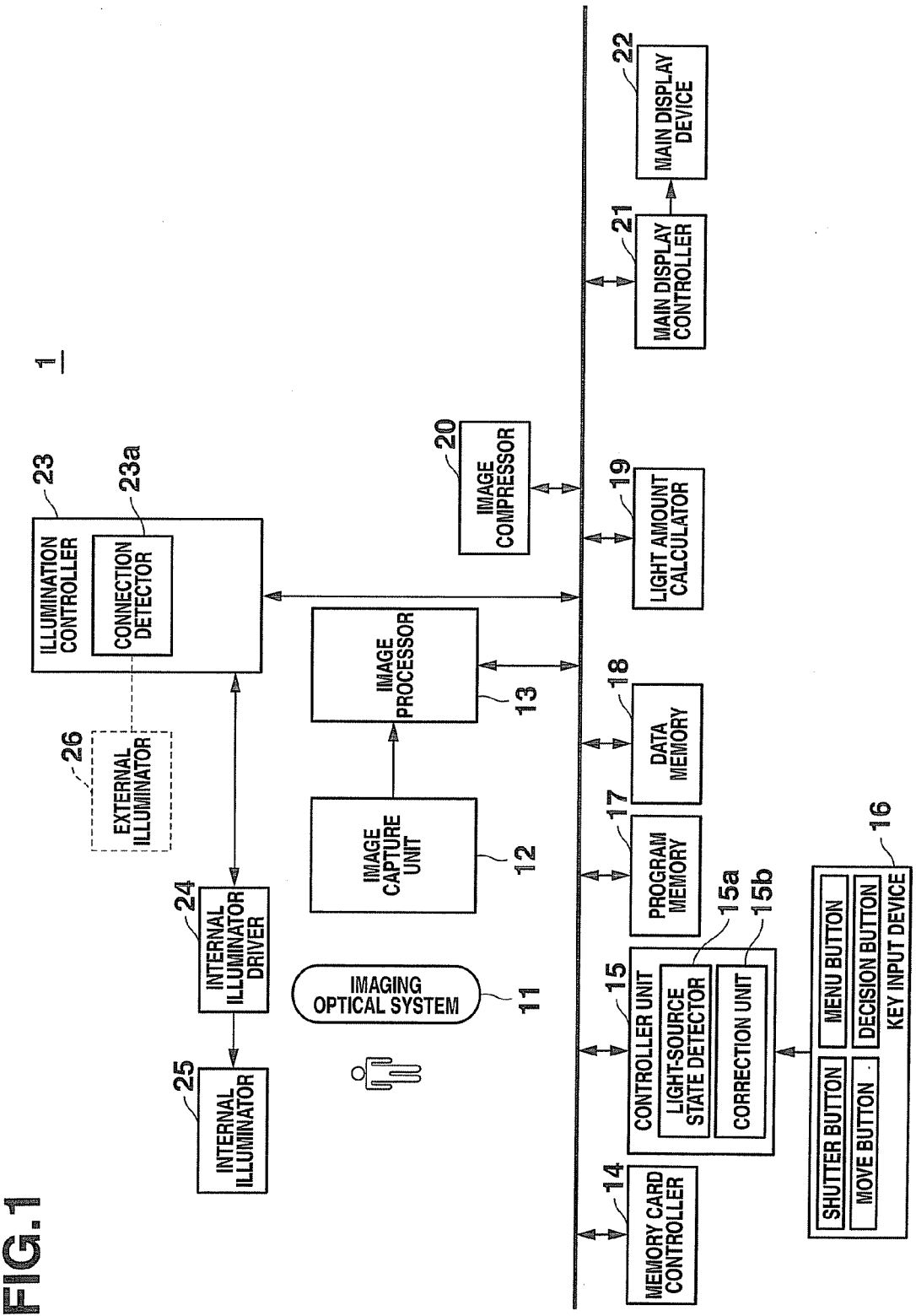
FIG. 1 is a block diagram showing a functional configuration of an image capture apparatus according to an embodiment of the present invention.

As shown in FIG. 1, the image capture apparatus 1 includes an imaging optical system 11, an image capture unit 12, an image processor 13, a memory card controller 14, a controller unit 15, a key input device 16, a program memory 17, a data memory 18, a light amount calculator 19, an image compressor 20, a main display controller 21, a main display device 22, an illumination controller 23, an internal illuminator driver 24, and an internal illuminator 25. In this image capture apparatus 1, the image processor 13 and the controller unit 15 present main functions of the image correction or image processing apparatus.

The imaging optical system 11 mainly includes a motor and a lens unit (not shown in FIG. 1). The lens unit includes lenses to lead external light. The lens unit functions as an optical system to form an image on an imaging element such as a CONS image sensor with external light from a given image-capture range. The lens unit includes a shutter unit and an aperture unit, which are not shown in the drawings. The motor drives the shutter unit and the aperture unit to move a focal position and to adjust an aperture value. The lens unit also includes a zoom lens for appropriately zooming in or out to change the image-capture range under the control of the controller unit 15.

The image capture unit 12 includes an imaging element such as a complementary metal-oxide semiconductor (CMOS) image sensor. The CMOS image sensor includes a color filter of, for example, RGB elementary colors. A timing generator and a vertical driver, which are not shown, drive sweeping of the CMOS image sensor. The CMOS image sensor outputs, by units of screen, a photoelectric conversion output corresponding to an optical image formed in a given period.

The image capture unit 12 includes a controlling section which operates under the control of the controller unit 15 and an analog to digital (A/D) conversion processing circuit. The controlling section in the image capture unit 12 controls operation of the lens unit in the imaging optical system 11 under the control of the controller unit 15. The A/D conversion processing circuit includes a sample hold circuit and an A/D converter. The A/D conversion processing circuit performs desirable processing on the photoelectric conversion output from the CMOS image sensor. Specifically, gain adjustment is performed on the photoelectric conversion output which is in an analog signal state for each of RGB elementary color component. Thereafter, the sample hold circuit performs sample holding on the conversion output and the A/D converter converts the output into a digital image data and outputs the image data to the image processor 13.

The image processor 13 performs image processing on the image data provided from the image capture unit 12. The image processor 13 separates the image data which is supplied as RGB data into luminance data (Y) and color-difference data (Cr, Cb). The image processor 13 generates the luminance data (Y), color-difference data (Cr) and color-difference data (Cb) by addition or subtraction of given proportions of R data, G data and B data in the RGB data. The image processor 13 outputs the luminance data (Y), color-difference data (Cr) and color-difference data (Cb) to the data memory 18, and the data memory 18 stores the output data therein. In addition, the image processor 13 may perform pixel interpolation processing, gamma correction processing, and matrix operation, if necessary.

The memory card controller 14 includes a recording and reproducing mechanism for a memory card provided in the image capture apparatus 1. The memory card controller 14 stores image data captured by the image capture apparatus 1 or image data subjected to correction, which is to be described below, into the memory card under the control of the controller unit 15. The memory card controller 14 reproduces and outputs the image data stored in the memory card under the control of the controller unit 15.

The controller unit 15 controls overall operations of the image capture apparatus 1. The controller unit 15 operates in accordance with a program stored in the program memory 17 to execute a variety of controlling processing necessary for the image capture apparatus 1.

Specifically, the controller unit 15 operates in accordance with an image correction program stored in the program memory 17. By executing the image correction program, the controller unit 15 subjects the captured image data to image correction processing depending on a light-source state at the time of image capture. The light-source state is designated based on at least one of a time point when the image is captured, a selection operation made by a user, a presence or an absence of flash light, and a strength of the flash light. Thus, the controller unit 15 performs correction processing (also referred to as filter processing) to reduce unnaturalness resulting from the light-source state in the image. The unnaturalness is derived form the light-source state, i.e., by the reason that there are a plurality of light sources, such as sunlight and flash light, internal illumination and sunlight, or internal illumination and flash light, at the time of image capturing. The unnaturalness appears as color variation (unevenness in color) having a low spatial frequency components on the image.

Specifically, processing which the controller unit 15 executes in accordance with the image correction program includes light-source state detection, two-dimensional discrete Fourier transform, image correction processing, and color-difference data (Cr, Cb) generation. The light-source state detection detects light-source state information representing a light-source state at the time of image capturing. The two-dimensional discrete Fourier transform generates frequency analysis data in the spatial frequency domain using the color-difference data (Cr, Cb) which the image processor 13 has stored in the data memory 18. The image correction processing corrects the frequency analysis data obtained by the two-dimensional discrete Fourier transform. The image correction processing corrects the frequency analysis data based on the light-source state information to reduce color variation (unevenness in color) generated in the captured image due to the light-source state. In the color-difference data generation, two-dimensional inverse discrete Fourier transform is performed on the frequency analysis data corrected by the image correction processing to newly generate color difference data after the correction.

In the image correction processing for the frequency analysis data, direct-current components and a part of spatial frequency components contained in the frequency analysis data are decreased. That is, the controller unit 15 subtracts, from the frequency analysis data, spatial frequency information of low spatial frequency components, which correspond to the color variation (unevenness in color) appeared in the captured image due to the light-source state. The spatial frequency component information includes amplitude corresponding to the spatial frequency components obtained by the two-dimensional discrete Fourier transform. The controller unit 15 subtracts, from the frequency analysis data, the spatial frequency information of low spatial frequency components corresponding to color variation in the image due to a plurality of light sources.

Figure 2A:
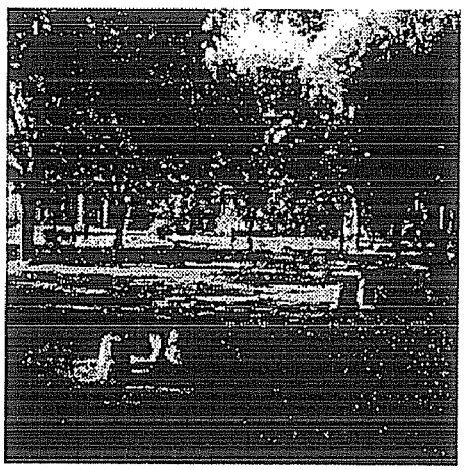
FIG. 2A is a view for explaining two-dimensional discrete Fourier transform executed by the image capture apparatus.
Figure 2B:
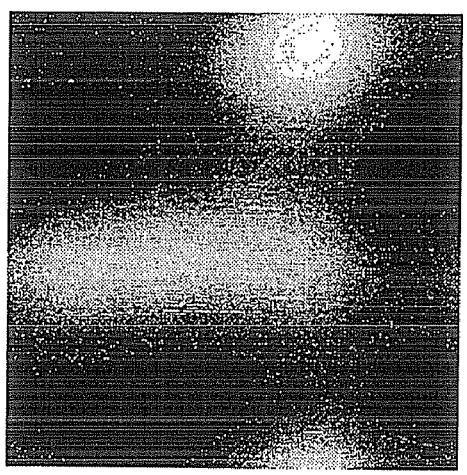
FIG. 2B is a view for explaining the two-dimensional discrete Fourier transform executed by the image capture apparatus and for showing spatial frequency components up to (3, 3)
Figure 2C:
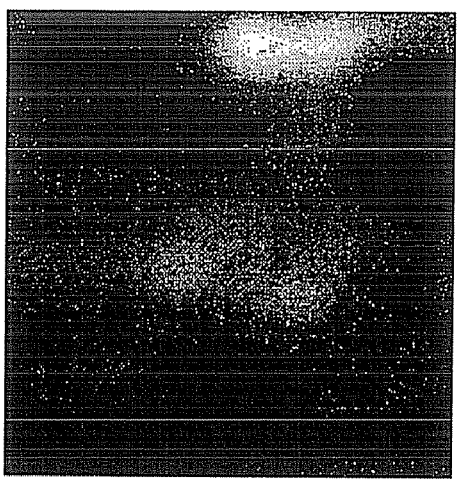
FIG. 2C is a view for explaining the two-dimensional discrete Fourier transform executed by the image capture apparatus and for showing spatial frequency components up to (6, 6)
Figure 2D:
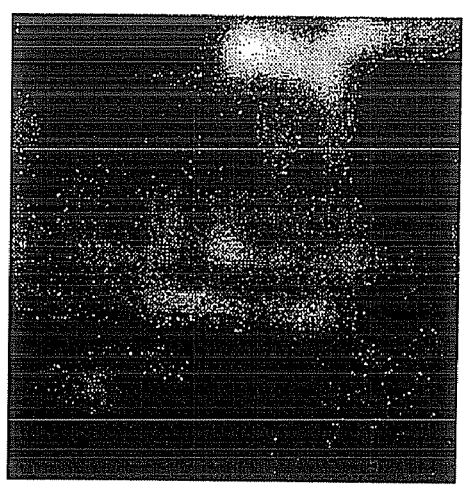
FIG. 2D is a view for explaining the two-dimensional discrete Fourier transform executed by the image capture apparatus and for showing spatial frequency components up to (10, 10)

For example, when two-dimensional discrete Fourier transform is performed on a captured image shown in FIG. 2A, frequency analysis data including spatial frequency information of n-th order (n is arbitrary number) is generated. In the n-th order frequency analysis data, the image data is transformed into functions of direct-current components and spatial frequency components (u, v). When the spatial frequency component information of third order is generated, i.e., when functions of low spatial frequency components up to (u, v)=(3, 3) are generated, an image having low spatial frequency components shown in FIG. 2B is provided. When the spatial frequency component information of sixth order is generated, i.e., when functions of low spatial frequency components up to (u, v)=(6, 6) are generated, an image having low spatial frequency components shown in FIG. 2C is provided. Furthermore, when the spatial frequency component information of tenth order is generated, i.e., when functions of low spatial frequency components up to (u, v)=(10, 10) are generated, an image having low spatial frequency components shown in FIG. 2D is provided. It should be noted that (u, v) denotes spatial frequency components. A spatial frequency component in x direction is denoted by "u" and a spatial frequency component in y direction is denoted by "v". Details of correction executed on such frequency analysis data will be described later.

The key input device 16 is operated by a user of the image capture apparatus 1. The key input device 16 includes a shutter button 16a, a menu button 16b, a move button 16c such as a cross key, a decision button 16d and the like. The key input device 16 is connected to the controller unit 15. The controller unit 15 receives an operation-instruction signal which represents operation made with the keys or buttons.

The image compressor 20 performs adaptive discrete cosine transform (ADCT) complying with a JPEG format on image data stored in the data memory 18 in accordance with control by the controller unit 15 to compress the data.

The main display controller 21 periodically reads luminance data (Y) and color-difference data (Cr, Cb) contained in the image data, and generates a video signal based on the read data. The main display controller 21 outputs the generated video signal to the main display device 22.

The main display device 22 is provided at the back of a main package (not shown) of the image capture apparatus 1. The main display device 22 functions as a monitor display device (electronic finder) in an image capture mode. In the image capture mode, the main display device 22 displays an image based on the video signal from the main display controller 21. Thus, the image capture apparatus 1 can display an image received from the main display controller 21 in real time.

When the main display device 22 is displaying a monitor image which is currently being captured, that is, when a through image is being displayed, the image capture apparatus 1 is set in a state where image shooting is possible. When the shutter button 16a in the key input device 16 is operated to instruct image capturing, a trigger signal is delivered to the controller unit 15. The controller unit 15 converts (or separates) one frame of RGB data, which the image capture unit 12 is capturing, into luminance data (Y) and color-difference data (Cb, Cr) in response to the trigger signal. The converted data is stored in the data memory 18.

The illumination controller 23 causes the internal illuminator driver 24 to drive the internal illuminator 25 to emit light under the control of the controller unit 15.

The internal illuminator driver 24 charges a large-capacity capacitor, which is not shown, for flash light emission when capturing a still image, then drives the internal illuminator 25 to emit light in accordance with the control by the controller unit 15 via the illumination controller 23. In the case of capturing a moving image, when the shutter button 16a is operated for the first time, image data of a still image being captured is compressed by the image compressor 20 and stored in the data memory 18. Thereafter, capturing and storing image data is repeated at a given frame rate, for example, at 30 frames per second (fps). When the shutter button 16a is operated for the second time, or when predetermined time limit, e.g., 30 seconds, has passed, files of the sequence of still image data stored in the data memory 18 are collectively reconfigured as a motion JPEG data file (AVI file).

The illuminator controller 23 includes a connection detector 23a which detects whether or not an external illuminator 26 is connected to the image capture apparatus 1. The connection detector 23a outputs, to the light amount calculator 19, a signal indicating whether or not the external illuminator 26 is connected.

The light amount calculator 19 calculates an amount of light emission when flash light is emitted for image capture under the control of the illuminator controller 23. The light amount calculator 19 calculates the light amount based on an operation signal from the illumination controller 23 when the illumination controller 23 controls automatically the internal illuminator 25 to emit light. When the connection detector 23a supplies the signal indicating that the external illuminator 26 is connected to the illuminator controller 23, the light amount calculator 19 calculates a light amount of combination of light emitted from the internal illuminator 25 and light emitted from the external illuminator 26. If the light amount is adjusted by operation made with the key input device 16 in prior, the light amount calculator 19 calculates a light amount of light from the internal illuminator 25, which emits light based on the set light amount. The calculated light amount is received by the controller unit 15.

The thus configured image capture apparatus 1 corrects image data by performing processing shown in FIGS. 3 to 7, when the user holds the image capture apparatus 1 to shoot an object.

A flowchart of FIG. 3 shows schematic processing of the image capture apparatus 1 according to the present embodiment. In step S1, image data having RGB components is captured by the imaging optical unit 11 and the image capture unit 12.

In step S2, the image processor 13 converts (or separates) the image data having RGB components into luminance data (Y) and color-difference data (Cr, Cb). The data memory 18 stores the luminance data (Y) and color-difference data (Cr, Cb).

In steps S3 to S8, the controller unit 15 reads the image correction program from the program memory 17 and executes the image correction processing. Firstly, in step S3, the controller unit 15 performs two-dimensional discrete Fourier transform on each of the color-difference data Cr and Cb which are stored in the data memory 18. The controller unit 15 converts the color-difference data into frequency analysis data in the spatial frequency domain containing information relating to discrete spatial frequencies.

The controller unit 15 performs two-dimensional discrete Fourier transform on the color-difference data (Cr) to derive frequency analysis data denoted by CrF(u, v), which is given from the expression below. Similarly, the controller unit 15 performs two-dimensional discrete Fourier transform on the color-difference data (Cb) to derive frequency analysis data denoted by CbF(u, v), which is given from the expression below.

$$CrF(u, v) = \frac{1}{N}\sum_{x=0}^{N-1}\sum_{y=0}^{N-1} Crf(x, y)\exp\{-j2\pi(ux+vy)/N\}$$

$$CbF(u, v) = \frac{1}{N}\sum_{x=0}^{N-1}\sum_{y=0}^{N-1} Cbf(x, y)\exp\{-j2\pi(ux+vy)/N\}$$

N in the above expressions denotes the number of pixels in vertical and horizontal directions. It should be noted that a typical image capture apparatus has different numbers of pixels in vertical and horizontal directions; however, for the sake of illustration, the image capture apparatus 1 of the present embodiment is assumed to have the same numbers of pixels in both directions. Moreover, (x, y) in the expressions denotes pixel coordinates and (u, v) denotes spatial frequency components, wherein u denotes a spatial frequency component in x direction and v denotes a spatial frequency component in y direction. In addition, Crf(x, y) denotes Cr component at the coordinates (x, y), Cbf(x, y) denotes Cb component at the coordinates (x, y), CrF(u, v) denotes Cr component corresponding to the spatial frequency components (u, v), and CbF(u, v) denotes Cb component corresponding to the spatial frequency components (u, v).

In step S4, the controller unit 15 detects information on direct-current and low spatial frequency components in the frequency analysis data generated by the two-dimensional discrete Fourier transform. As described in detail below, the controller unit 15 subtracts, from the frequency analysis data, spatial frequency information corresponding to color variation (unevenness in color) appearing in the image depending on a light-source state around an object.

Color variation (unevenness) appears in the image depending on the light-source state of the time point when the image is captured. The user may recognize the color variation in the image as a noise. Therefore, the controller unit 15 detects the spatial frequency information of the direct-current and low spatial frequency components to reduce the color variation. In specific, the spatial frequency information of low spatial frequency components corresponding to the color variation is detected in order to reduce the color variation resulting from presence of a plurality of light sources.

In step S5, the controller unit 15 determines whether or not amplitude of detected low spatial frequency components is smaller than a threshold. When the amplitude is smaller than the threshold, the flow goes to step S6. If not, the flow is terminated.

In step S6, the controller unit 15 subtracts the direct-current and low spatial frequency components from the original image data. Specifically, amplitude decreasing or amplitude subtraction is executed in association with CrF(u, v) that is Cr components at the direct-current components (where (u, v)= (0, 0)) and certain spatial frequency components Cu, v). Similarly, decreasing processing or amplitude subtraction is executed in association with CrF(u, v) that is Cr components at the direct-current components (where (u, v)=(0, 0)) and certain spatial frequency components Cu, v).

When spatial frequency information corresponding to color variation appearing in the captured image is preliminarily set spatial frequency information relating to low spatial frequencies in the frequency analysis data, the controller unit 15 eliminates the preliminarily set spatial frequency information from the frequency analysis data. That is, data relating to the preliminarily set spatial frequency components are wholly eliminated. In more detail, as shown in FIG. 2B, when the color variation according to the light-source state appears, the low spatial frequency components shown in FIG. 2B are subjected to deletion from the image data.

When it is determined that the amplitude of the preliminarily set spatial frequency components is smaller than the threshold, the controller unit 15 may subtract the amplitude corresponding to the preliminarily set spatial frequency components from the frequency analysis data. A quantity to be subtracted may be set so that the amplitude becomes equal to or lower than a predetermined amplitude threshold value. Alternatively, a preliminarily set quantity of amplitude may be subtracted.

It is preferable that the threshold is set based on the light-source state of the time point when the image is captured. This is because the light-source state affects the color variation which appears in the captured image. The manufacturer of the image capture apparatus 1 can obtain what spatial frequency component corresponds to the color variation due to the light-source state and how much the color variation affects the amplitude, in prior. The threshold may be set to be a value obtained in design time, or a value established in prior to image capture. The light-source state may be designated depending on the time of image capturing, a selection operation made by the user, a presence or an absence of flash light, and the strength of the flash light. That is, the threshold is determined to reduce the color variation derived from the light-source state.

In step S7, the controller unit 15 executes the two-dimensional inverse discrete Fourier transform on the frequency analysis data which has been subjected to the subtraction (correction) in step S6. That is, the controller unit 15 executes the two-dimensional inverse discrete Fourier transform that is an inverse process of the two-dimensional discrete Fourier transform executed in step S3.

The controller unit 15 executes the two-dimensional inverse discrete Fourier transform on Cr component of frequency analysis data to obtain color-difference data (Cr) at the coordinates (x, y), which is denoted by the expression below as HCrf(x, y). Similarly, the controller unit 15 executes the two-dimensional inverse discrete Fourier transform on Cb component of frequency analysis data to obtain color-difference data (Cb) at the coordinates (x, y), which is denoted by the expression below as HCbf(x, y).

$$HCrf(x, y) = \frac{1}{N}\sum_{u=0}^{N-1}\sum_{v=0}^{N-1} HCrF(u, v)\exp\{j2\pi(ux+vy)/N\}$$

$$HCbf(x, y) = \frac{1}{N}\sum_{u=0}^{N-1}\sum_{v=0}^{N-1} HCbF(u, v)\exp\{j2\pi(ux+vy)/N\}$$

In the expressions, HCrf(x, y) denotes Cr component at the coordinates (x, y), HCrF(u, v) denotes Cr component at the spatial frequency components (u, v) after the correction of step S6, HCbf(x, y) denotes Cb component at the coordinates (x, y), and HCbF(u, v) denotes Cb component at the spatial frequency components (u, v) after the correction of step S6.

As described above, the controller unit 15 can obtain color difference data HCrf(x, y) and HCbf(x, y) improved by execution of the correction of step S6. From the frequency analysis data obtained in step S3, the direct-current and certain spatial frequency components are eliminated to provide the color-difference data HCrf(x, y) and HCbf(x, y).

In step S8, the controller unit 15 produces the captured image after the correction using the color difference data (Cr, Cb) on which the correction in step S6 is executed and the illuminance data (Y) which is obtained in step S2.

Thus, the image capture apparatus 1 executes the correction processing to eliminate the spatial frequency components representing the color variation in the captured image due to the light-source state of the time of image capture. Therefore, the image capture apparatus 1 can eliminate the color variation appearing in the captured image and can provide a properly corrected image.

Subsequently, specific processing of the image capture apparatus 1 will be described with reference to flowcharts in FIGS. 4 to 7 and threshold tables in FIGS. 8 to 12.

When the shutter button 16*a* is fully-depressed, image capturing is started from processing of step S11 in the image capture apparatus 1.

In step S11, the imaging optical system 11 and the image capture unit 12 captures image data corresponding to light received from the image-capture range.

In step S12, the image processor 13 obtains color component data including RGB data from the image capture unit 12.

The controller unit 15 executes processing of step S13 which is a part of the image correction program stored in the program memory 17.

In step S13*a* of step S13, under the control of the controller unit 15, the image processor 13 separates luminance data (Y) and color-difference data (Cr, Cb) from the color component data (RGB data) captured in step S12. The luminance data (Y) and the color-difference data (Cr, Cb) are temporarily stored in the data memory 18. In the present embodiment, YCrCb system is employed as a color coordinate system. However, the RGB data is not necessarily be separated into Y, Cr, and Cb data. A color coordinate system such as YUV system or YIQ system in which color-difference component can be separated from luminance component or brightness component may be employed to the present invention in a similar manner.

In step S13*b*, the controller unit 15 executes the two-dimensional discrete Fourier transform (frequency conversion) on the color-difference data (Cr, Cb) stored in the data memory 18 to convert the color-difference data into spatial frequency components including direct-current and discrete components. Thus, the controller unit 15 obtains frequency-analysis data containing a set of spatial frequency information representing amplitude values of spatial frequency components.

It should be noted that the frequency-analysis data does necessarily not include amplitude values of whole spatial frequency components.

Figure 5:
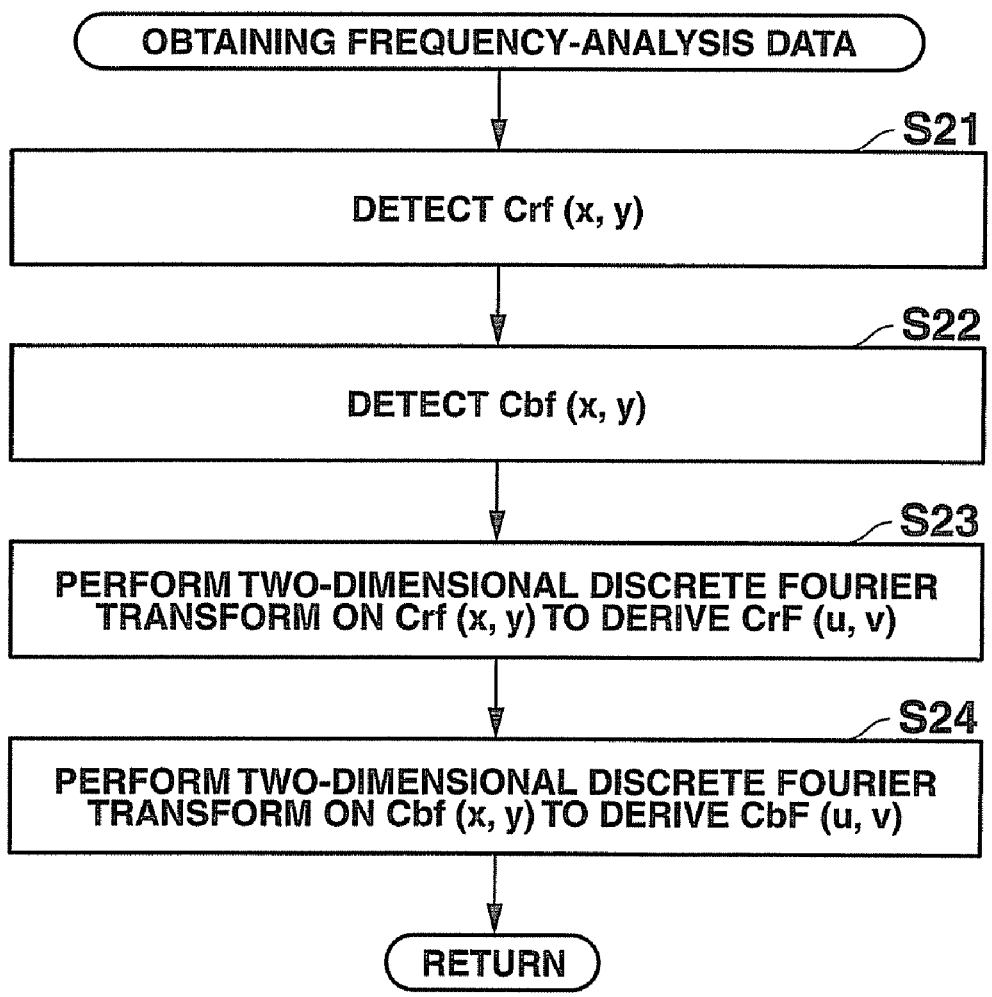
FIG. 5 is a flowchart showing procedure for obtaining frequency analysis data.

FIG. 5 is a flowchart which shows processing to obtain the frequency-analysis data, which is executed in step S13*b*, in detail.

In step S21, color-difference data Crf(x, y) at coordinates (x, y) is detected, and in step S22, color-difference data Cbf(x, y) at coordinates (x, y) is detected. The controller unit 15 then executes the two-dimensional discrete Fourier transform on the color-difference data Crf(x, y) to derive spatial frequency information CrF(u, v) in step S23, and executes the two-dimensional discrete Fourier transform on the color-difference data Cbf(x, y) to derive spatial frequency information CbF(u, v) in step S24. According to such frequency-analysis data deriving processing, the controller unit 15 can derive frequency-analysis data representing what spatial frequency component has what amplitude in the color-difference data (Cr) and frequency-analysis data representing what spatial frequency component has what amplitude in the color-difference data (Cb).

Figure 4:
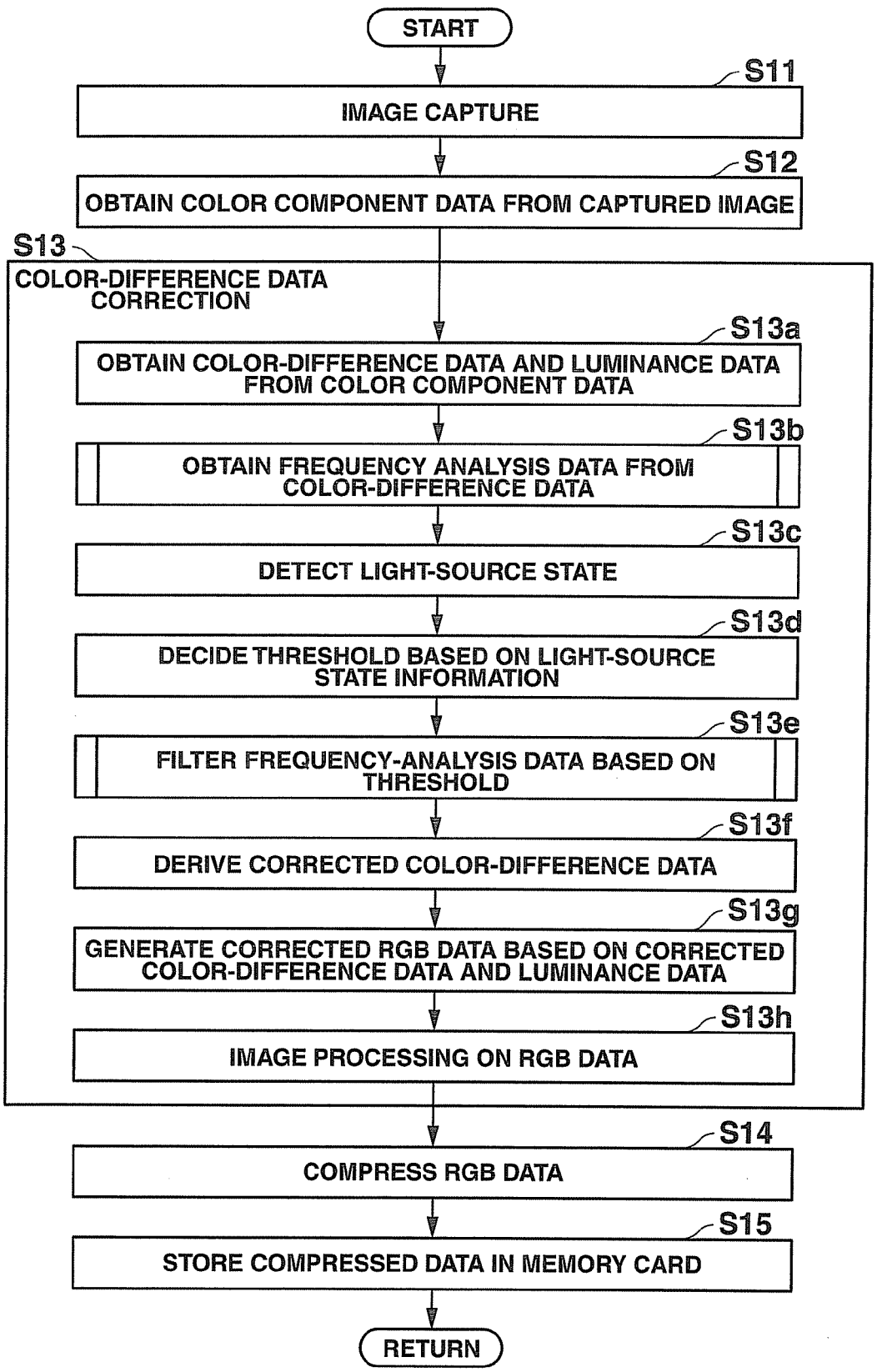
FIG. 4 is a flowchart showing detailed procedure of the image correction processing.

Then, the flow goes to step S13*c* of FIG. 4, and the controller unit 15 (state detector 15*a*, to be specific) detects light-source state information representing a current light-source state. Items of the light-source state information to be considered have been already set. Items to be detected as the light-source state may be at least one of the time point when the image data is captured, the selection operation made by the user, a presence or an absence of flash light emission by the internal illuminator 25 or the external illuminator 26, and the strength of the flash light. The time point when the image data is captured can be measured by a timer (not shown) provided in the controller unit 15. In addition, a certain light-source state, for example, a case where it is designated that a light-source state value=4 in step S52 described later, may be set by selection operation made by the user. The controller unit 15 detects a presence or an absence of the flash light emission by the internal illuminator 25 and the strength of the flash light utilizing the light amount calculator 19. Moreover, the controller unit 15 determines whether or not the external illuminator 26 is connected to the connection detector 23*a* and detects a presence or an absence of the flash light emission by the external illuminator 26 and the strength of the flash light by utilizing the light amount calculator 19.

Figure 6:
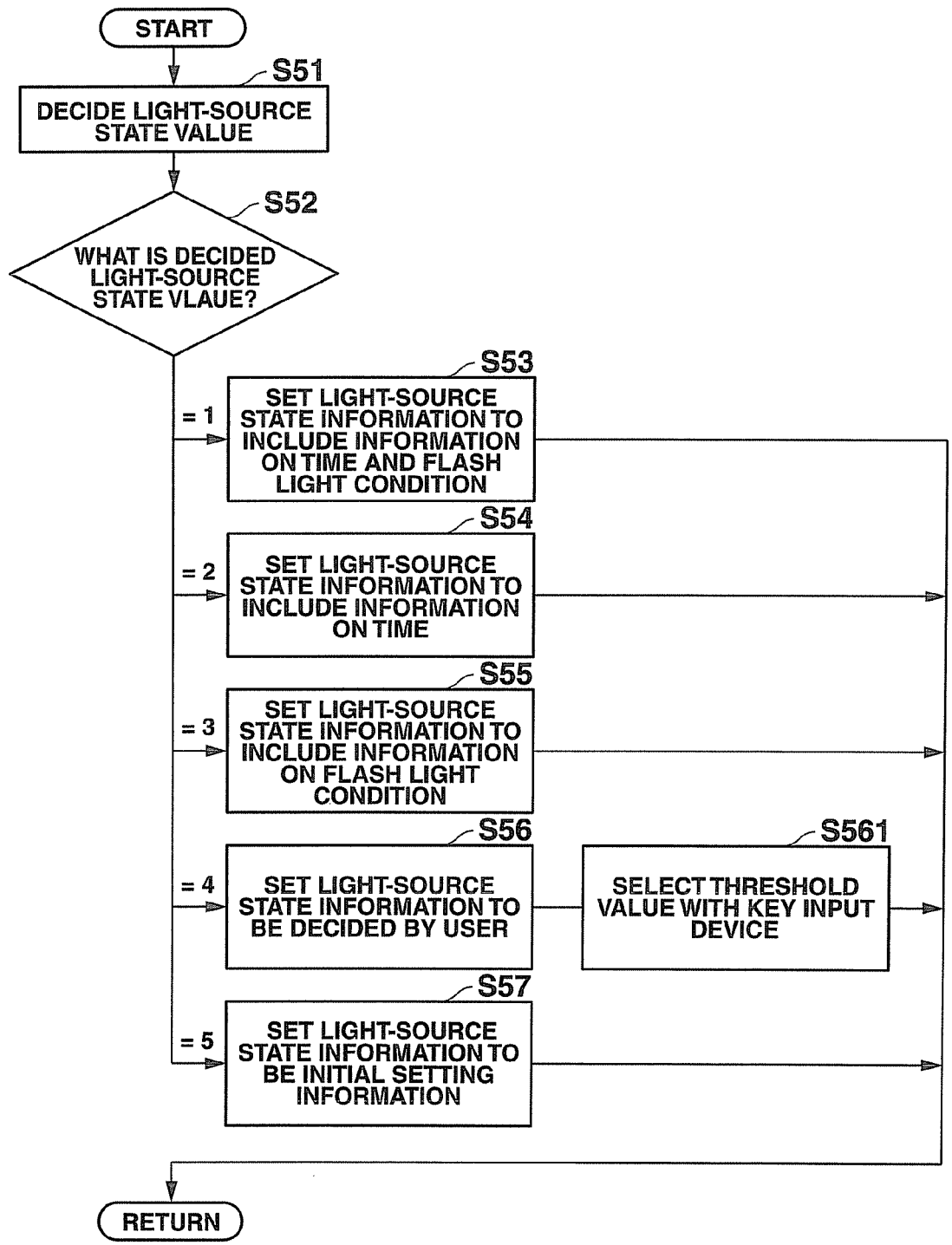
FIG. 6 is a flowchart showing procedure for setting light-source state information.

The light-source state to be considered may be set in accordance with the flowchart shown in FIG. 6 in prior; or alternatively, image capturing may be paused to execute the processing of FIG. 6.

Regarding FIG. 6, the light-source state value can be set to "1"-"5" by operation of the menu button 16*b*, the move button 16*c* and the decision button 16*d* in the key input device 16. In step S51, the light-source state value is decided within the range from 1 to 5 by operation made with the key input device 16. The controller unit 15 detects the decided light-source state value in step S52.

When "1" is set as the light-source state value, the controller unit 15 executes processing of step S53. In step S53, the controller unit 15 provides a threshold table shown in FIG. 8 which stores values of threshold x in association with time and flash conditions for the data memory 18.

When "2" is set as the light-source state value, the controller unit 15 executes processing of step S54. In step S54, the controller unit 15 provides a threshold table shown in FIG. 9 which stores values of threshold x in association with time conditions for the data memory 18.

When "3" is set as the light-source state value, the controller unit 15 executes processing of step S55. In step S55, the controller unit 15 provides a threshold table shown in FIG. 10 which stores values of threshold x in association with flash conditions for the data memory 18.

When "4" is set as the light-source state value, the controller unit 15 executes processing of step S56. In step S56, the controller unit 15 provides a threshold table shown in FIG. 11 which stores values of threshold x in association with time and flash conditions for the data memory 18. Then, in step S561, one of the threshold values x is selected in accordance with selection made with the key input device 16.

When "5" is set as the light-source state value, the controller unit 15 executes processing of step S57. In step S57, the controller unit 15 provides a threshold table shown in FIG. 12 which stores a value of threshold x in association with the initial setting for the data memory 18.

The light-source state information may include information items other than those above. For example, the light-source state information may include an information item which allows specifying or presuming the number of light sources or types of the light sources which are obtainable from the captured image, and the value of threshold x may be determined based on such information item. The information item may also be considered in addition to the at least one of the time point when the image data is captured, a selection operation made by the user, a presence or an absence of flash light emission, and the strength of the flash light, when determining the value of threshold x. Thus, the unnaturalness in the image due to the light-source state can be further reduced.

In addition, not manual operation by the user but automatic operation by the image correction function may set the selection of the light-source state value based on analysis results of the captured image. Thus, the unnaturalness in the image due to the light-source state can be further reduced.

Then, the flow goes to step S13d in FIG. 4, and the controller unit 15 decides a value of the threshold x based on the light-source state information detected in step S13c. The controller unit 15 selects the value of the threshold x with reference to the threshold table present in the data memory 18 and based on the detected light-source state information.

Specifically, when the light-source state information includes information on the time of image capture and the flash light condition, the controller unit 15 decides one of x1-x8 as the value of the threshold x in accordance with the information on the time of image capture and on the flash light with reference to the threshold table shown in FIG. 8. When the external illuminator 26 is not connected to the illumination controller 23 and only the internal illuminator 25 is used to emit flash light, a value of guide number (GN) corresponding to the light amount is set to a constant value of "GN 10". When the external illuminator 26 is connected to the illumination controller 23, the light amount calculator 19 calculates the value of GN corresponding to the light from the internal illuminator 25 and the external illuminator 26, and the value of the threshold x is decided based on the time of image capture and the value of GN. When both of the internal illuminator 25 and the external illuminator 26 are utilized, the value of GN becomes "GN 20" or "GN 30" depending on the type of the external illuminator 26. The type of the external illuminator 26 is detected (in step S13c) by the light amount calculator 19 to calculate the value of GN. The guide number GN is a standard unit of strength of the flash light. When the value of GN is larger, the light amount of the flash light emission is regarded to be larger.

When the light-source state information includes information on the time of image capture, the value of the threshold x is decided to be one of x9 and x10 based on the time information with reference to the threshold table shown in FIG. 9.

When the light-source state information includes information on the flash light condition, the value of the threshold x is decided to be one of x11-x14 based on the value of GN, which is calculated by the light amount calculator 19, with reference to the threshold table shown in FIG. 10.

When the light-source state information includes the time information and on the flash light condition, the value of threshold x is decided to be one of x15-x20, which is selected in step S561, with reference to the threshold table shown in FIG. 11.

When the light-source state information includes the initial setting information, the value of threshold x is decided to be x21 with reference to the threshold table shown in FIG. 12.

Figure 7:
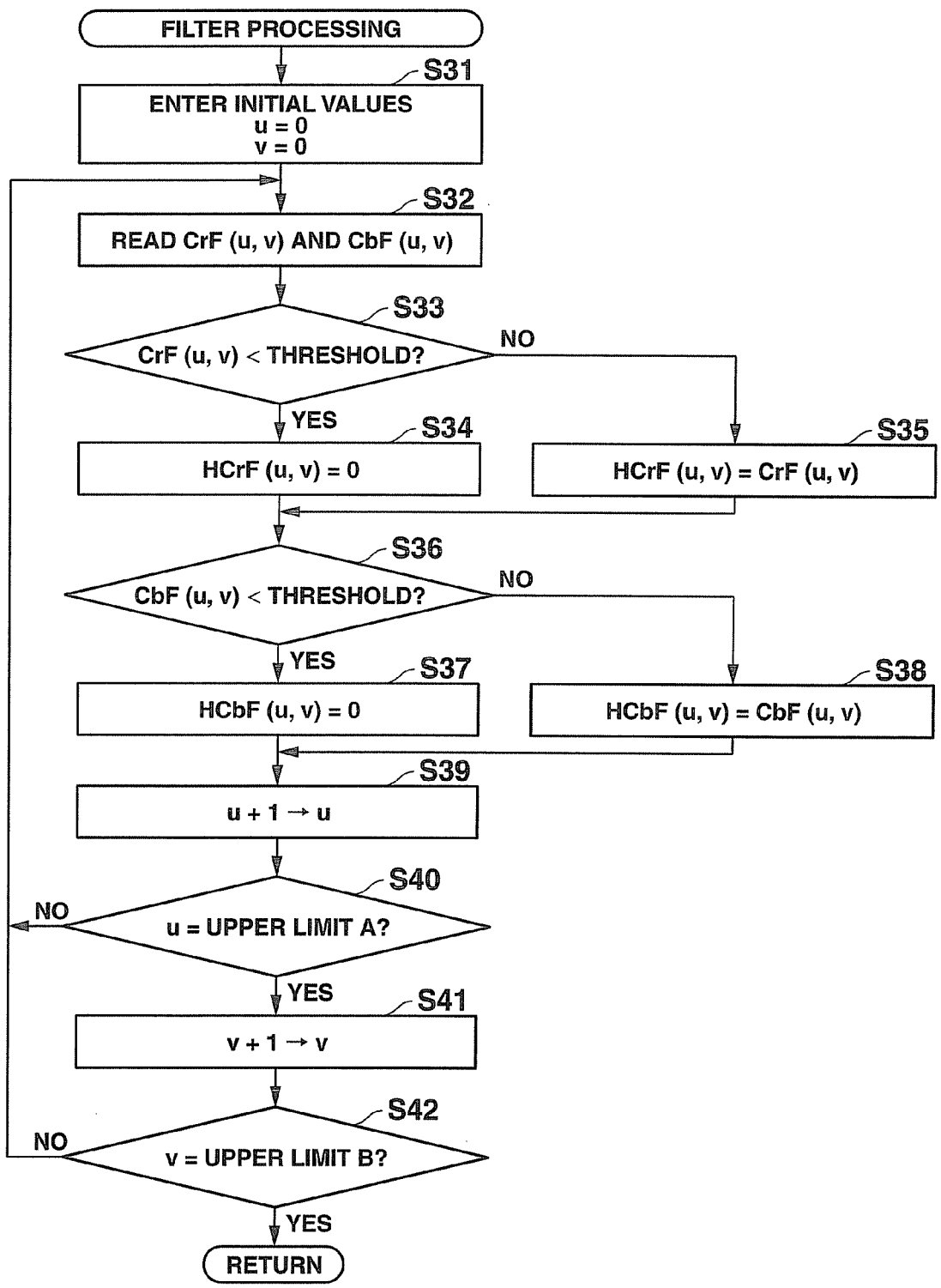
FIG. 7 is a flowchart showing procedure of filter processing.

In step S13e, the controller 15 (correction unit 15b, to be specific) executes the filter processing that subtracts a part of frequency analysis information from the frequency analysis data based on the value of threshold x decided in step S13d. Details of the filter processing are shown in FIG. 7. In step S31, u=0 and v=0 are entered as initial values of spatial frequency components (u, v). When u=0 and v=0, the spatial frequency components (u, v) correspond to direct-current components.

In step S32, the controller unit 15 reads spatial frequency information $CrF(u, v)$ and $CbF(u, v)$ which denote amplitude corresponding to the spatial frequency components (u, v) and are calculated and stored in the data memory 18 in step S13b in reference to the current spatial frequency components (u, v) which are set in step S31 or in step S39 or S41 to be described later.

In step S33, the controller unit 15 determines whether or not the spatial frequency information $CrF(u, v)$ is smaller than the decided value of threshold x. When the spatial frequency information $CrF(u, v)$ is not smaller than the threshold x, filtering is not performed on the spatial frequency information. Thus, corrected spatial frequency information denoted by $HCrF(u, v)$ is set to be equal to the spatial frequency information $CrF(u, v)$ in step S35. Then, the flow goes to step S36. On the other hand, when the spatial frequency information $CrF(u, v)$ is smaller than the value of threshold x, filtering is performed on the spatial frequency information $CrF(u, v)$ in step S34. Thus, corrected spatial frequency information denoted by $HCrF(u, v)$ is set to zero. Then, the flow goes to step S36.

In the present embodiment, the corrected spatial frequency information $HCrF(u, v)$ is eliminated to be "0" in step S34; however, the corrected spatial frequency information $HCrF(u, v)$ may not be set to zero. A predetermined portion may be subtracted from the spatial frequency information $CrF(u, v)$, for example, the spatial frequency information $CrF(u, v)$ may be subtracted to become 10% of the original spatial frequency information $CrF(u, v)$.

In step S36, the controller unit 15 determines whether or not the spatial frequency information $CbF(u, v)$ is smaller than the decided value of threshold x. When the spatial frequency information $CbF(u, v)$ is not smaller than the value of threshold x, filtering is not performed on the spatial frequency information. Thus, corrected spatial frequency information denoted by $HCbF(u, v)$ is set to be equal to the spatial frequency information $CbF(u, v)$ in step S38. Then, the flow goes to step S39. On the other hand, when the spatial frequency information $CbF(u, v)$ is smaller than the value of threshold x, filtering is performed on the spatial frequency information $CbF(u, v)$ in step S37. Thus, corrected spatial frequency information denoted by $HCbF(u, v)$ is set to zero. Then, the flow goes to step S39.

In the present embodiment, the corrected spatial frequency information $HCbF(u, v)$ is eliminated to be "0" in step S37;

however, the corrected spatial frequency information HCbF (u, v) may not be set to zero. A predetermined portion of the spatial frequency information CbF(u, v) may be subtracted, for example, 10% of the spatial frequency information CbF(u, v) may be subtracted from the spatial frequency information CbF(u, v).

The value of threshold x to be compared with the spatial frequency information CrF(u, v) in step S33 may differ from the value of threshold x to be compared with the spatial frequency information CbF(u, v) in step S36. When a plurality of threshold tables are referred to regardless of setting operation made by the user, a plurality of values of threshold x may be selected in correspondence with the light-source state, and a minimum value xmin or a maximum value xmax of the selected values may be used.

In step S39, the controller unit 15 increments the value of u of the spatial frequency components (u, v). In step S40, the controller unit 15 determines whether or not the value of u arrives at an upper limit A of given spatial frequency component range. Similarly, in step S41, the controller unit 15 increments the value of v of the spatial frequency components (u, v). In step S42, the controller unit 15 determines whether or not the value of v arrives at an upper limit B of given spatial frequency component range. When both values of u and v arrive at respective upper limits A and B, the flow returns to step S13 in FIG. 4.

The upper limits A and B of the given spatial frequency component ranges range from the direct-current components ((u, v)=(0, 0)) to given low spatial frequency components (u, v) which correspond to color variation appearing on the image due to the light-source state. For example, when the color variation shown in FIG. 2B appears on the captured image of FIG. 2A, in order to reduce the color variation, the upper limits A and B are set to "3" (i.e. (u, v)=(3, 3)). Therefore, spatial frequency components corresponding to the color variation shown in FIG. 2B can be suppressed in the captured image of FIG. 2A. Thus, values of the upper limits A and B are set so as to filter efficiently the color variation which the light-source state causes in the image data. The values of the upper limits of A and B may differ from each other depending on the variation to be reduced from the image data. The values of the upper limits A and B may be changeable in order that proper spatial frequency components can be subtracted in dependence upon the light-source state.

Then, the flow goes to step S13*f* of FIG. 4, the controller unit 15 executes the two-dimensional inverse discrete Fourier transform on the frequency-analysis data, which is subjected to the filter processing, to derive corrected color-difference data (Cr, Cb).

In step S13*g*, the controller unit 15 generates corrected RGB data (color component data) from the corrected color-difference data (Cr, Cb) which is derived in step S13*f* and the luminance data (Y) which is obtained in step S13*a*.

In step S13*h*, the controller unit 15 executes predetermined image processing on the corrected RGB data. The controller unit 15 may execute image processing such as conventional white balance processing to correct effects of the light-sources on the image data. Then the corrected RGB data is stored in the data memory 18. The image correction processing in accordance with step S13 of the image correction program is finished and the flow goes to step S14.

In step S14, the image compressor 20 compresses the corrected RGB data. The compressed data is stored in the data memory 18.

In step S15, the controller unit 15 causes the memory card controller 14 to store the compressed data into the memory card, and terminates the flow.

As described above in detail, the image capture apparatus 1, according to the present embodiment, corrects the captured image data by subtracting a part of spatial frequency components from whole spatial frequency components obtained from image data. Thus, the color variation resulting from a light-source state on a captured image can be eliminated. Therefore, with the image capture apparatus 1, image correction can be executed on images captured in various light-source states and unnaturalness in the image due to the light-source states can be moderated.

According to the present embodiment, since the spatial frequency information corresponding to the color variation appearing in the image is subtracted from frequency-analysis data based on light-source state information, even when different color variations are shown up in the captured image in dependence upon the light-source state, correction can be properly executed.

In addition, according to the present embodiment, spatial frequency information to be subtracted from the image data is set to that of lower spatial frequency components in the frequency-analysis data. Therefore, spatial frequency information of spatial frequency components corresponding to color variation appearing in the captured image can be subtracted based on the light-source state information.

According to the present embodiment, when amplitude of the preliminarily set spatial frequency components is smaller than a given threshold, spatial frequency information of the set spatial frequency components is subtracted from the frequency-analysis data. Accordingly, if the amplitude of the spatial frequency components corresponding to the color variation is large and significant in the image, spatial frequency information of the spatial frequency components can be set to be "0".

Alternatively, when the amplitude of the preliminarily set spatial frequency components is smaller than the given threshold, the amplitude of the set spatial frequency components is decreased to be small enough. Therefore, if the amplitude of the spatial frequency components corresponding to the color variation is large and significant in the image, spatial frequency information of the spatial frequency components can be obscured.

In the present embodiment, items of the light-source state information to be considered are set in prior; however, the invention is not so limited. For example, when image data captured in step S1 or S11 is analyzed to detect the number and types of the light sources, items of the light-source state information may be set based on an analysis result.

According to the present embodiment, the light-source state is designated based on at least one of time of image capture, a selection operation made by the user, a presence or an absence of flash light emission, and strength of the flash light. The value of threshold can be changed based on the light-source state. Therefore, the color variation can be reduced with high accuracy. Moreover, reducing color variation inherent in the image can be avoided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image correction apparatus comprising:
   an image capture unit configured to capture image data;
   a separator unit configured to separate the image data captured by the image capture unit into luminance data and color-difference data;
   a conversion unit configured to convert the color-difference data separated by the separator unit into a set of amplitude values in a spatial frequency domain;
   a light-source state detector configured to detect a light-source state when the image capture unit captures the image data;
   a correction unit configured to correct the set of amplitude values converted by the conversion unit based on the light-source state detected by the light-source state detector so that a predetermined amplitude value is decreased from the set of amplitude values;
   an inverse-conversion unit configured to inversely convert the set of the amplitude values in the spatial frequency domain which is corrected by the correction unit to produce corrected color-difference data; and
   a corrected image generator configured to generate corrected image data from the corrected color-difference data and the luminance data.

2. The image correction apparatus according to claim 1, wherein
   the correction unit comprises a determination unit configured to determine whether or not to correct an amplitude value of a low spatial frequency in the set of amplitude values in the spatial frequency domain, and
   the correction unit decreases the amplitude value of the low spatial frequency when the determination unit determines to correct the amplitude value.

3. The image correction apparatus according to claim 2, wherein the determination unit determines to correct the amplitude value when the amplitude value is smaller than a predetermine threshold value.

4. The image correction apparatus according to claim 3, wherein
   the state detector detects information on at least one of a time point when the image capture unit captures the image data, a selection operation made by a user, a presence or an absence of flash light emission, and a strength of the flash light emission as light-source state information, and
   further comprising a setting unit configured to set the threshold value based on the light-source state information.

5. An image correction method comprising:
   a step of separating captured image data into luminance data and color-difference data;
   a step of converting the color-difference data separated by the separating step into a set of amplitude values in a spatial frequency domain;
   a step of detecting a light-source state when the image data is captured;
   a step of correcting the set of amplitude values converted by the converting step based on the light-source state detected by the detecting step so that a predetermined amplitude value is decreased from the set of amplitude values;
   a step of inversely converting the set of the amplitude values in the spatial frequency domain which is corrected by the correcting step to produce corrected color-difference data; and
   a step of generating corrected image data from the corrected color-difference data and the luminance data.

6. A non-transitory computer readable storage medium having a computer program stored thereon that is executable by a computer to control the computer to perform:
   separating captured image data into luminance data and color-difference data;
   converting the color-difference data separated by the separating process into a set of amplitude values in a spatial frequency domain;
   detecting a light-source state when the image data is captured; correcting the set of amplitude values converted by the converting process based on the light-source state detected by the detecting process so that a predetermined amplitude value is decreased from the set of amplitude values;
   inversely converting the set of the amplitude values in the spatial frequency domain which is corrected by the correcting process to produce corrected color-difference data; and
   generating corrected image data from the corrected color-difference data and the luminance data.

* * * * *